(12) United States Patent
Tiirola et al.

(10) Patent No.: US 9,838,161 B2
(45) Date of Patent: Dec. 5, 2017

(54) BUNDLING HARQ FEEDBACK IN A TIME DIVISION DUPLEXING COMMUNICATION SYSTEM

(71) Applicant: Nokia Solutions and Networks Oy, Espoo (FI)

(72) Inventors: Esa Tapani Tiirola, Kempele (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 48 days.

(21) Appl. No.: 15/022,953

(22) PCT Filed: Sep. 27, 2013

(86) PCT No.: PCT/EP2013/070219
§ 371 (c)(1),
(2) Date: Mar. 18, 2016

(87) PCT Pub. No.: WO2015/043657
PCT Pub. Date: Apr. 2, 2015

(65) Prior Publication Data
US 2016/0211948 A1    Jul. 21, 2016

(51) Int. Cl.
*H04L 1/18* (2006.01)
*H04L 1/06* (2006.01)
*H04L 1/16* (2006.01)
*H04L 5/14* (2006.01)

(52) U.S. Cl.
CPC ............ *H04L 1/1812* (2013.01); *H04L 1/06* (2013.01); *H04L 1/1621* (2013.01); *H04L 1/1671* (2013.01); *H04L 1/1861* (2013.01); *H04L 5/14* (2013.01)

(58) Field of Classification Search
CPC .......... H04L 5/0055; H04L 5/001; H04L 5/14
See application file for complete search history.

(56) References Cited

U.S. PATENT DOCUMENTS

| 8,514,883 B2 * | 8/2013 | Pan ...................... H04L 1/1635 370/328 |
| 2013/0242814 A1 | 9/2013 | Wang et al. .................. 370/280 |
| 2016/0205680 A1 * | 7/2016 | Nguyen ............ H04W 72/0446 370/280 |

FOREIGN PATENT DOCUMENTS

| WO | WO 2010/091165 A2 | 8/2010 |
| WO | WO 2013/138021 A1 | 9/2013 |

OTHER PUBLICATIONS

3GPP TSG-RAN WG1 #74, Barcelona, Spain, Aug. 19-23, 2013, R1-132927, "HARQ aspect for TDD eIMTA", Intel Corp., 4 pgs.
3GPP TSG-RAN Meeting #58, Barcelona, Spain, Dec. 4-7, 2012, RP-121772, "New work item proposal for Further Enhancements to LTE TDD for DL-UL Interference Management and Traffic Adaptation", CATT, 15 pgs.

(Continued)

*Primary Examiner* — Chandrahas Patel
(74) *Attorney, Agent, or Firm* — Harrington & Smith

(57) ABSTRACT

Feedback determined for a plurality of subframes within a time window in a time division duplex system is bundled into at least two sets of feedback information based on differently timed bundling windows defined based on subframe types. When feedback associated with the plurality of subframes is received, possible errors in the subframes is determined based on the at least two sets of feedback information.

19 Claims, 5 Drawing Sheets

Figure 3:
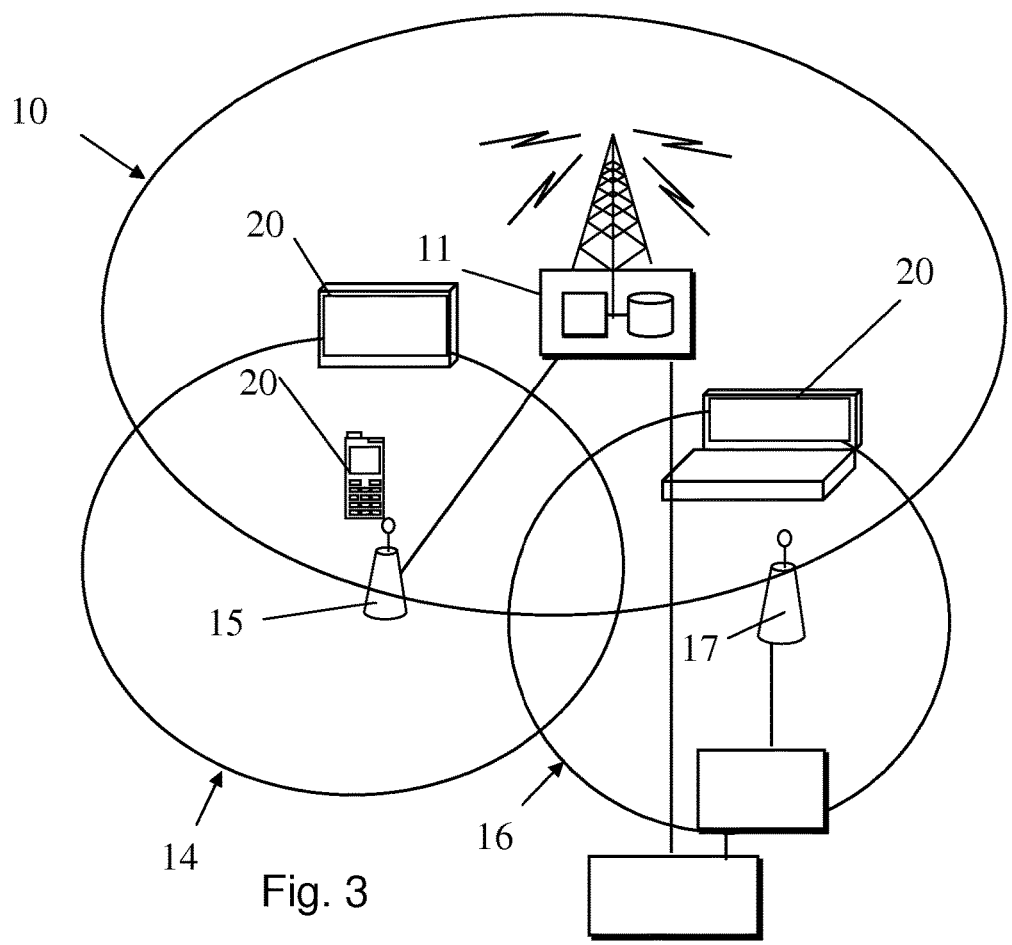

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(56) References Cited

OTHER PUBLICATIONS

3GPP TS 36.213 V11.3.0 (Jun. 2013), "3$^{rd}$ Generation Partnership Project; Technical Specification Group Radio Access Network; Evolved Universal Terrestrial Radio Access (E-UTRA); Physical layer procedures, (Release 11)", 176 pgs.

* cited by examiner

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 1

| | 0 | 1 | 2 | 3 | 4 | 5 | 6 | 7 | 8 | 9 |
|---|---|---|---|---|---|---|---|---|---|---|
| SIB-1 | D | S | U | U | U | D | S | U | U | U |
| Flex | D | S | U | F | F | D | F | F | F | F |

Fig. 2

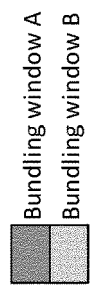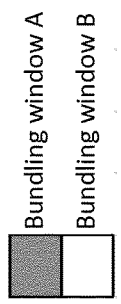

| HARQ-ACK(0), HARQ-ACK(1), HARQ-ACK(2) | $n^{(1)}_{PUCCH}$ | $b(0)b(1)$ |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No Transmission | |

BUNDLING HARQ FEEDBACK IN A TIME DIVISION DUPLEXING COMMUNICATION SYSTEM

This disclosure relates to communication of feedback in a communication system, and more particularly bundling feedback associated with a plurality of subframes.

A communication system can be seen as a facility that enables communications between two or more nodes such as fixed or mobile communication devices, access points such as base stations, servers, machine type terminals, and so on. A communication system and compatible communicating entities typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the equipment shall be configured.

Signals can be carried on wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A cell can be provided by a base station, there being various different types of base stations and cells.

A user can access the communication system by means of an appropriate communication device or terminal. A communication device is provided with an appropriate signal receiving and transmitting arrangement for enabling communications with other parties. Typically a communication device is used for enabling receiving and transmission of communications such as voice, images, video and other data. A communication device of a user is often referred to as a user equipment (UE).

Communications between an user equipment and a base station can be considered as taking place in two directions, namely the uplink (UL), i.e. from the UE to the base station or the downlink (DL), i.e. from the base station towards the UE.

Time Division Duplexing (TDD) based systems can benefit from flexible resource split between the UL and DL. This can be facilitated by means of predefined patterns. The UL and DL communications can be configured to follow patterns where certain resources are allocated to UL and other resources to DL communications. Conventionally the Uplink-Downlink (UL-DL) configuration has been kept relatively stationary. However, flexible UL-DL reconfiguration has been proposed for example for Release 12 of the third Generation Partnership Project (3GPP) Long Term Evolution (LTE) standard. In the LTE environment such concept is called enhanced Interference Management and Traffic Adaptation (eIMTA). An aim of eIMTA is to enable more flexible TDD UL-DL reconfiguration for traffic adaptation in e.g. small cells. It is assumed that the base station, or eNodeB (eNB) in accordance with LTE specifications, may vary UL-DL configuration relatively often for those UEs configured for flexible UL-DL configuration compared to a situation where Uplink-Downlink (UL-DL) configuration is in practice stationary.

For easier understating of the background in the context of possible 3GPP Release 12 requirements for flexible UL-DL configuration certain non-limiting assumptions can be made. It can be assumed that a predefined UL-DL configuration is broadcast, for example by using System Information Block 1 (SIB-1). Legacy UEs (i.e. those based on LTE Releases 8/9/10/11) can follow this configuration all the time. Also, it is currently assumed that no new TDD UL-DL configurations are to be introduced. Thus existing Time Division Duplexing (TDD) UL-DL configurations can be used and the flexible TDD UL-DL reconfigurations can take place among existing seven configurations. In a flexible UL-DL configuration at least one subframe can be used dynamically for uplink or downlink. In this context a subframe can be understood to refer to a timing unit for communications in time domain. For example, a UE can receive physical downlink shared channel (PDSCH) transport block(s) during a subframe. The existing seven subframe configurations for the LTE are shown in FIG. 1.

TDD UL-DL reconfiguration can occur with radio frame periodicity for those UEs configured to use flexible UL-DL configuration. It is also assumed that fixed and flexible subframes are available in UL-DL configuration. In the fixed subframes the link direction is always predetermined and thus known. The fixed subframes can be denoted as D (Downlink), S (Special) and U (Uplink). Flexible (F) subframes can be used dynamically as downlink (D) or uplink (U) subframes. The number of flexible subframes may depend on the scenario. This can be determined e.g. by SIB-1 configuration, dedicated higher layer signalling, and/ or DL reference configuration defining HARQ/scheduling timing for Physical Downlink Control Channel (PDSCH).

FIG. 2 illustrates an example of such arrangement. The radio frame has Downlink (D), Uplink (U) and Special (S) subframes according to exemplary SIB-1 configuration #0 and Flexible subframes available for LTE Release 12 UEs configured to a flexible UL-DL mode. It is noted that the TDD configuration #0 is shown only as an example, and it is noted that the same principles can be applied to other configurations 1-6 as well. It is also noted that subframe #6 is a special case of flexible subframes since it cannot be changed into UL as only special subframes and DL subframes are supported with subframe #6. Other flexible subframes can be used as UL or DL subframes within the limitations of supported UL-DL configurations.

Error correction feedback messages such as Physical Uplink Control Channel (PUCCH) Hybrid Automatic Repeat reQuest acknowledgement (HARQ-ACK) transmissions can be provided in association with enhanced interference management and traffic adaptation (eIMTA). One option for HARQ-ACK signalling is to simply feedback separate HARQ-ACK for each PDSCH transport block for all subframes. This option is referred to as ACK/NACK multiplexing. A problem in ACK/NACK multiplexing is that the number of feedback bits can become large, especially in the case of UL-DL configuration 5 (up to 20 bits). This can result worse coverage for feedback signalling. In order to guarantee sufficient coverage and resource utilization efficiency for HACK-ACK signalling, ACK/NACK bundling can be applied to reduce the HARQ-ACK feedback payload. The basic concept of ACK/NACK bundling is to bundle multiple HARQ-ACKs into one by using logical AND operation. In TDD HARQ-ACKs for several PDSCH of DL subframes (up to 9) may be transmitted during a single UL subframe.

However, bundling of feedback messages, for example in ACK/NACK bundling, is not without problems. Currently ACK/NACK bundling relies on the assumption that the PDSCH block error rate in the subframes that belong to the same bundle is correlated. In eIMTA, the downlink (DL) channel conditions do not vary significantly among consecutive DL subframes. However, when used as DL subframes, flexible subframes experience interference which may be fundamentally different from that of fixed DL subframes. In flexible subframes, in addition to DL-to-DL interference, also UL-to-DL interference can be present. Depending on the deployment scenario, the interference may originate from the same carrier and/or from adjacent carriers. There can be considerable differences on the average interference level due to differences on the eNB and UE transmission powers as well as on applied power control approaches. Additionally, UL-to-DL interference level can change rapidly between physical resource blocks (PRBs) as well as between subframes, depending e.g. on Physical Uplink Shared Channel (PUSCH) scheduling decisions, on the path loss of scheduled UEs as well as on the PRB allocation that is granted to the scheduled UEs.

The fact that different types of subframes have different interference conditions can cause complications to ACK/NACK bundling design. Bundling of ACK/NACK over both fixed and flexible subframes has the risk of causing throughput loss when there is e.g. a slight error in link adaptation for one of the subframe types. Another point to consider is the fact that in eIMTA, due to the so called reference configurations principle, there are typically quite many DL subframes associated with a single UL subframe available for the Hybrid Automatic Repeat reQuest (HARQ) feedback.

Furthermore, one of the eIMTA scenarios is based on semi-statically configured DL-reference configuration #5 which corresponds to DL-heavy operation. This configuration does not support ACK/NACK multiplexing at all (in current releases) due to high number of DL subframes in the bundling window.

Thus an efficient bundling operation would be desired.

It is noted that the above discussed issues are not limited to any particular communication environment and apparatus but may occur in any appropriate system where bundling of feedback may be desired. The bundling may also be provided by partial bundling. Bundling may also be used in combination with other ACK/NACK or other feedback signalling methods such as ACK/NACK multiplexing. From conceptual point of view this can be seen as partial bundling.

Embodiments of the invention aim to address one or several of the above issues.

In accordance with an aspect there is provided method for bundling feedback in a time division duplex system, comprising bundling feedback determined for a plurality of subframes within a time window into at least two sets of feedback information based on differently timed bundling windows defined based on subframe types.

In accordance with another aspect there is provided method for receiving feedback in a time division duplex system, comprising receiving feedback associated with a plurality of subframes within a time window from a receiver, the feedback being bundled into at least two sets of feedback information based on differently timed bundling windows defined based on subframe types, and determining possible errors in the subframes based on the at least two sets of feedback information.

In accordance with another aspect there is provided an apparatus for a communication device, the apparatus comprising at least one processor, and at least one memory including computer program code, wherein the at least one memory and the computer program code are configured, with the at least one processor, to cause the communication device to bundle feedback determined for a plurality of subframes within a time window in a time division duplex system into at least two sets of feedback information based on differently timed bundling windows defined based on subframe types.

In accordance with another aspect there is provided an apparatus for a communication network, the apparatus comprising at least one processor, and at least one memory including computer program code, wherein the at least one memory and the computer program code are configured, with the at least one processor, to process received feedback associated with a plurality of subframes within a time window from a receiver, the feedback being bundled into at least two sets of feedback information based on differently timed bundling windows defined based on subframe types to determine possible errors in the subframes based on the at least two sets of feedback information.

In accordance with a more detailed aspect the feedback is determined by taking into account information of a possible downlink assignment reception failure separately for each bundling window.

The bundling may comprise mapping hybrid automatic repeat request (HARQ) acknowledgements (ACK/NACK/DTX) for the plurality of subframes into respective sets of feedback information. The feedback may be send to a transmitter in a subframe.

In accordance with a more detailed aspect a bundling window is for flexible subframes and another bundling window is for fixed subframes. One bundling window may cover system information block 1 configured downlink subframes or system information block 1 configured downlink subframes and special subframes and another bundling window may cover other downlink subframes.

The subframes may be divided between different bundling windows based on higher layer configuration of the windows or a predetermined timing configuration of the bundling windows.

Further bundling windows determined based on codewords may be used.

According to one aspect sets of feedback information for a plurality of subframes covered by the respective bundling windows comprise each a single bit. According to one possibility a set of feedback information for a plurality of subframes covered by a first bundling window comprises a plurality of bits and another set of feedback information for a plurality of subframes covered by second bundling window comprises a single bit. According to a yet further possibility sets of feedback information for a plurality of subframes covered by the respective bundling windows comprise each a plurality of bits. Acknowledgement resource may be selected based on determination whether hybrid automatic repeat request (HARQ) bundling of each bundling window corresponds to a positive or a negative acknowledgement.

The bundling may be provided in association with enhanced interference management and traffic adaptation (eIMTA).

The subframes for which the feedback associates with may be communicated in the downlink and the feedback information may be communicated in the uplink.

A device for a communication system adapted to provide the herein described aspect can also be provided. According to an aspect the device comprises mobile user equipment and according to another aspect the device comprises base station apparatus.

A computer program comprising program code means adapted to perform the herein described methods may also be provided. In accordance with further embodiments apparatus and/or computer program product that can be embodied on a computer readable medium for providing at least one of the above methods is provided.

A network node such as a base station node or a controller associated with one or more cells and a communication device such as a mobile station can be configured to operate in accordance with the various aspects. A communication system embodying the apparatus and principles of the invention may also be provided.

It should be appreciated that any feature of any aspect may be combined with any other feature of any other aspect.

Figure 4:
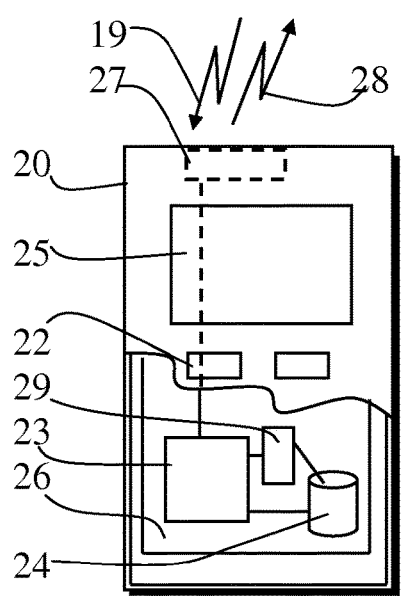
Figure 5:
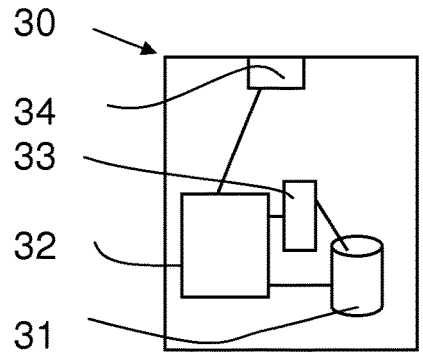
Figure 6:
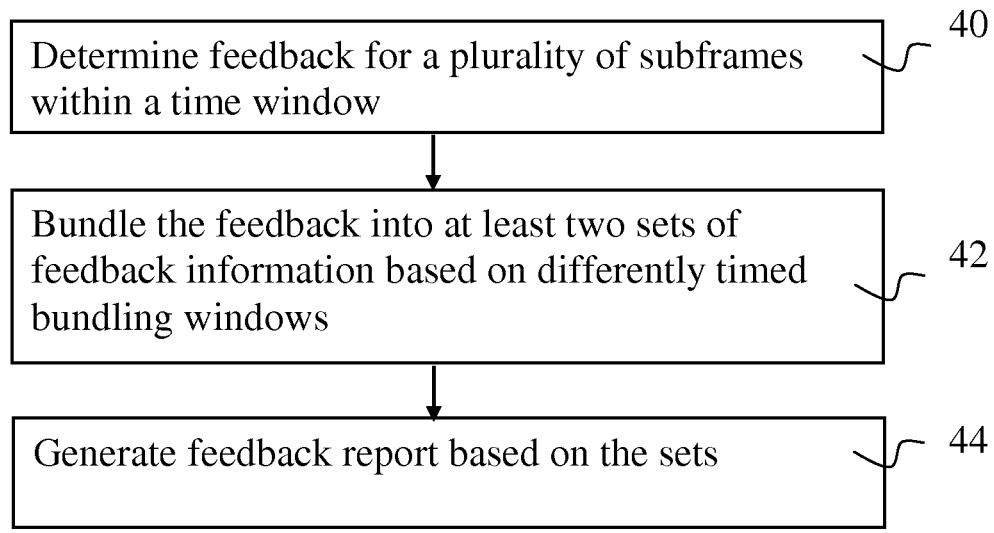
Figure 7:
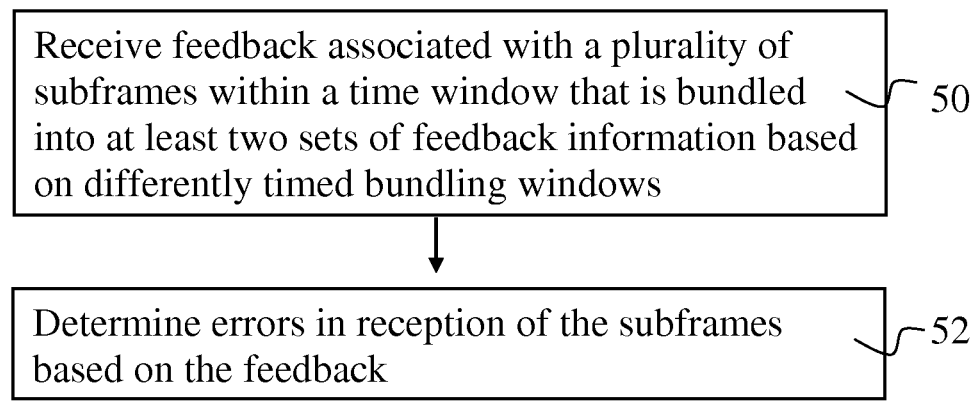
Figures 10, 11:
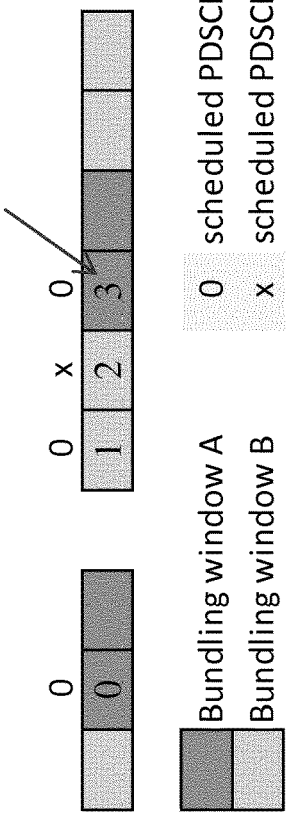

Embodiments will now be described in further detail, by way of example only, with reference to the following examples and accompanying drawings, in which:

FIG. 1 shows an example of possible UL-DL configurations,

FIG. 2 shows a radio frame with certain possible types of subframes in accordance with two different modes, FIG. 3 shows a schematic diagram of a cellular system where certain embodiments can be implemented, FIG. 4 shows an example of a communication device, FIG. 5 shows an example of control apparatus for a base station, FIGS. 6 and 7 are flowcharts in accordance with certain embodiments, FIGS. 8 and 9 show examples of bundling windows according to certain embodiments, FIG. 10 shows a multiplexing table that may be used for feedback reporting, and FIG. 11 shows an example for error handling at a reporting device.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 3 to 5 to assist in understanding the technology underlying the described examples.

A non-limiting example of the recent developments in cellular communication system architectures is the long-term evolution (LTE) of the Universal Mobile Telecommunications System (UMTS) that is being standardized by the 3rd Generation Partnership Project (3GPP). The recent versions of the standard are often referred to as LTE Advanced (LTE-A). The LTE employs a mobile architecture known as the Evolved Universal Terrestrial Radio Access Network (E-UTRAN). Base stations of LTE and LTE-A systems are known as Node Bs or evolved or enhanced Node Bs (eNodeB; eNB), respectively, and may provide E-UTRAN features such as user plane Radio Link Control/Medium Access Control/Physical layer protocol (RLC/MAC/PHY) and control plane Radio Resource Control (RRC) protocol terminations towards communication devices. A base station such as eNodeB can provide coverage for an entire cell or similar radio service area. Other examples of radio access system include those provided by base stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Communication devices or terminals 20 can be provided wireless access via base stations or similar wireless transmitter and/or receiver nodes. In FIG. 3 different cells 10, 14 and 16 are shown being provided by base stations 11, 15 and 17, respectively. It is noted that the number of cells and their borders are shown schematically for illustration purposes only in FIG. 3. Thus it shall be appreciated that the number, size, shape and type of the cells may vary considerably from those shown in FIG. 3.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

FIG. 4 shows a schematic, partially sectioned view of a communication device 20 that can be employed in the herein described examples. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. A mobile device is typically provided with at least one data processing entity 23, for example a central processing unit and/or a core processor, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device may receive and transmit signals 28 by a base station or another communication device via appropriate apparatus for receiving and transmitting signals. In FIG. 4 the transceiver apparatus is designated schematically by block 27. The transceiver may be provided for example by means of a radio part and associated antenna arrangement. The antenna arrangement may be arranged internally or externally to the mobile device.

Space-division multiplexing may be provided by multiple antenna elements forming a phased array antenna. For example, a wireless communication device can be arranged for communication via a Multiple Input/Multiple Output (MIMO) antenna elements. Other examples include single-input and multiple-output (SIMO) and multiple-input and single-output (MISO) multiplexing.

FIG. 5 shows an example of a control apparatus 30, for example to be integrated with, coupled to and/or otherwise arranged for controlling at least one of the cells of FIG. 3. The control apparatus 30 can be arranged to provide control on communications in the area of a single cell or a plurality of cells. The control apparatus 30 can be configured to provide control functions in association with scheduling, feedback reporting and error correction in one or more cells in accordance with certain embodiments described below. For this purpose the control apparatus comprises at least one memory 31, at least one data processing unit 32, 33 and an input/output interface 34. Via the interface the control apparatus can be coupled to a receiver and a transmitter of at least one base station. The control apparatus can be configured to execute an appropriate software code to provide the control functions. It shall be appreciated that similar component can be provided in a control apparatus provided elsewhere in the system.

The mobile device and the base station can be arranged to provide an error correction feedback mechanism where feedback bundling is used. In accordance with the herein disclosed principles the feedback associated with a plurality of received subframes is bundled into different sets of feedback information based on bundling windows that are arranged to cover different subframes in time domain. Thus a set of feedback information will cover a different set of subframes than another set of feedback information. In other words, splitting of different subframes between different windows can be provided.

FIG. 6 shows a flowchart for a method for bundling feedback at a receiving node in a time division duplex system. The receiving node determines feedback associated with a plurality of subframes within a time window at 40. The determined feedback is bundled at 42 into at least two sets of feedback information based on differently timed bundling windows defined based on subframe types.

A feedback report can then be generated at 44 for sending to the sender based on the generated sets of feedback information. The bundled feedback may be communicated during a subframe, for example in an UL subframe.

FIG. 7 shows a flowchart for receiving feedback in a time division duplex system at a node sending in a plurality of subframes within a time window. The feedback associated with the plurality of subframes within the time window is received at 50 from a recipient of the subframes, the feedback being bundled into at least two sets of feedback information based on differently timed bundling windows defined based on subframe types. Goodness of the reception/possible errors in the subframes can then be determined at 52 based on the at least two sets of feedback information.

Determining of feedback may comprise taking into account information of a possible downlink assignment reception failure separately for each bundling window.

According to a more specific scenario the bundling comprises HARQ-ACK bundling operation taking place when a UE receives at least two subframes in a bundling window. Hybrid automatic repeat request (HARQ) acknowledgements (positive; ACK/negative; NACK) for a PDSCH transport blocks transmitted in plurality of subframes can be mapped into respective sets of feedback information for sending feedback to a transmitter.

The following describes in more detail certain examples in relation to HARQ feedback in LTE based systems and more particularly with reference to systems based on 3GPP LTE Release 12. The herein explained embodiments focus in particular on physical uplink control channel (PUCCH) HARQ-ACK transmission related to dynamic UL-DL reconfiguration for time division (TD) LTE. The herein described exemplifying ACK/NACK bundling scheme takes in particular into account specific characteristics and requirements of eIMTA.

ACK/NACK bundling relies on the assumption that the physical downlink shared channel (PDSCH) transport block error rate in the subframes belonging to the same bundle is somewhat correlated. Usually, e.g. in conventional time division duplex (TDD) systems up to LTE Release 11 this is the case, assuming that the controlling eNodeB chooses to schedule the different transport block in the bundle with the same modulation and coding scheme (MCS).

In accordance with an example multiple, preferably two, time-domain bundling windows are defined for a given UL subframe carrying HARQ-ACK. In accordance with one possibility one of the bundling windows may include at least System Information Block one (SIB-1) configured DL subframes. In accordance with a possibility fixed special subframes or fixed and flexible special subframes are also included in this window. Another bundling window may then include other, flexible DL subframes.

Another possibility is that the eNB utilizes higher layer configuration signalling for providing the subframe split between the different bundling windows, thereby dividing the subframes between different bundling windows based on a higher layer configuration.

Yet another possibility is to specify a predetermined split of bundling windows i.e. a predetermined timing configuration of the bundling windows.

An example of bundling windows for UL-DL configuration in accordance with SIB1 configuration 0 is shown in FIG. 8. The highlighted bundling window A is shown to include SIB-1 configured DL subframes and special subframes. The highlighted "F" subframe can be according to SIB-1 configuration a special subframe, and it is therefore included. All other F subframes are included in bundling window B. These subframes can be used as UL subframes, based on the eIMTA operation.

The split between fixed and flexible DL subframes can be configured by the eNB e.g. via higher layer signalling. It is also possible to derive the split from information available for the user equipment. For example, the split can be derived from information such as SIB-1 defined UL-DL configuration and DL reference configuration.

FIG. 9 illustrates a bundling window arrangement with DL reference configuration #5 and with different SIB1-defined UL-DL configurations 0 to 6. The presented ACK/NACK bundling windows are for sending the feedback in UL subframe #2. The nine DL subframes are provided according to HARQ-ACK UL-DL configuration #5, or DL reference configuration. In this example all downlink subframes and special subframes (including special flexible subframes) are included in window A and all flexible subframes are included in window B in all configurations.

Separate HARQ-ACK feedback may be provided for PDSCH codewords transmitted in multiple time-domain bundling windows using for example one of the following possibilities.

In accordance with a possibility feedback information is compressed into one bit (ACK, NACK/DTX) per time domain bundling window A and B. When e.g. eIMTA bundling is enabled spatial bundling (i.e. bundling of HARQ-ACK feedback for the PDSCH codewords corresponding to different spatially multiplexed streams) can be applied first for ACK/NACK within a bundling window. The ACK/NACK from bundling window A is mapped into b0 (bit #0). The ACK/NACK from bundling window B is in turn mapped into b1 (bit #1). Feedback information comprising the two sets of information in the form of [b0, b1] is then transmitted using e.g. PUCCH Format 1b.

A possibility is to represent HARQ-ACK feedback corresponding to one bundling window (e.g. A) using multiple bits whereas the feedback corresponding to the other bundling window (e.g. B) can be compressed into one bit (ACK, NACK/DTX). For example, a first bundling window creates at least two bits, e.g. [b0, b1] or [b0, b1, b2].

Spatial bundling may be applied during the first ACK/NACK bundling window, depending on the number of subframes involved. If spatial bundling is used the number of subframes can correspond to the number of bits. It is also possible to provide the feedback without spatial bundling. For example, [b0, b1] may relate to HARQ-ACK of one subframe and two spatial codewords. It is also possible to have two subframes where two bits e.g. [b0 and b1] are related to one subframe and two spatial codewords, whereas the third bit is related to the second subframe (HARQ-ACK corresponding to two codewords is spatially bundled).

A second bundling window then results one further bit, [b2] or [b3]. Spatial bundling may be used in the case of dual-codeword PDSCH. [b0, b1, b2] or [b0, b1, b2, b3] is then transmitted using PUCCH Format 1b with channel selection.

In accordance with a more detailed example an existing HARQ-ACK multiplexing table is applied in a specific way. FIG. 10 shows as an example Table 10.1.3.2-2 of 3GPP TS 36.213 Release 11 V11.3.0. In FIG. 10 example HARQ-ACK(0) and HARQ-ACK(1) relate to a first bundling window and HARQ-ACK(2) relates to a second bundling window. Instead of use of an existing table, a possibility is to define a new HARQ-ACK multiplexing table for this use case An UE can determine failed DL assignments (i.e. those it did not receive at all) based on a downlink association index (DAI) included in DL assignments. However, the UE may not be able to determine failed assignments at the ends of the bundles (assuming that DAI is based on pure counter). Nevertheless, it is possible to detect an error situation from the feedback even when no specific error indication is send in cases where the last assignment(s) associated with an end of a bundle fails. This can be provided by an arrangement where transmission via a resource corresponding to the second bundling window is triggered when the second bundling window is ACK. More particularly, an UE can wrongly assume correct reception even when one or more assignments at the end of a bundling window is/are missing. For example, the final assignment associated with the second bundling window may fail whereas the other assignments are correctly received and the UE incorrectly assumes that it correctly received also the entire second bundle of subframes. As a result, the UE signals a positive ACK also for the second bundle of subframes. This could be a severe error as a positive acknowledgement (ACK) is provided instead of a discontinuous transmission indication (DTX) also for a subframe that actually failed. However, if the UE utilizes a resource corresponding to the last correctly received assignment associated with the second bundling window the network node can detect the error case based on the feedback from UE since the ACK is delivered via a wrong resource.

The properties of the table (M=3) shown in FIG. 10 are such that in case the second bundle of subframes is ACK a transmission is triggered via a resource associated with the second bundle. Missing final assignment means that the ACK is transmitted via the second last resource of the bundle window instead of the final resource. The eNB can thus detect that ACK was send although DTX error should have been send since the ACK is received via the penultimate resource of the second bundle instead of the last resource.

Spatial domain bundling can be applied in addition to time domain bundling. In accordance with a simple example in a case where there are four DL subframes, each with two codewords and consequently 4*2=8 HARQ-ACK bits in total the feedback can be presented as (b00,b01; b10,b11; b20,b21; b30,b31). Each HARQ-ACK bit can be denoted as bxy, where x is the index of subframe (0,1,2,3) and y is the index of codeword (0,1). Moreover, e.g. two time domain bundling windows can be provided, for subframes 0,1 and 2,3, respectively. If spatial bundling is not applied, the feedback is provided by four bits: (b00 AND b10); (b01 AND b11); (b20 AND b30); (b21 AND b31). If spatial bundling is also applied then it is possible to have just two bits of feedback: (b00 AND b10 AND b01 AND b11); (b20 AND b30 AND b21 AND b31).

According to a possibility for the bundling where spatial bundling is not applied the ACK/NACK feedback for two bundling windows can comprise up to four HARQ-ACK bits [b0, b1, b2, b3] (one bit for each codeword and bundling window). In this case, PUCCH format 1b with channel selection can be utilized for HARQ-ACK feedback.

The usage of three options above may vary from case by case, e.g. based on the number of subframes in the bundling windows. Specific solutions can be applied when HARQ-ACK with eIMTA bundling coincides with Scheduling Request (SR) or channel quality indicator (CQI). For example, in the case ACK/NACK coincides with CQI transmitted using PUCCH Format 2, ACK/NACK can be multiplexed with CQI using PUCCH Format 2b. In the case ACK/NACK coincides with SR transmitted using PUCCH Format 1, UE may use a single bundling window.

According to a possibility error case handling for bundling with bundling windows at the UE side can be provided such that downlink assignment index principle can be the same as 3GPP LTE Release 8. Consider reception of DL assignment transmitted via (enhanced) physical downlink control channel ((E)PDCCH) and reception of related physical downlink shared channel (PDSCH). NACK is determined if cyclic redundancy check (CRC) of the PDSCH reception is negative. DTX is determined if related (E)PDCCH is not detected, i.e. the UE does no receive related PDSCH at all. To feedback this the UE can utilize the physical uplink control channel (PUCCH) resource corresponding to the last subframe in the bundling window defined by DL reference configuration. It does not matter whether this corresponds to bundling window A or bundling window B. UE determines ACK/NACK/DTX corresponding to each bundling window based on received assignments and related (DL) Downlink Association Index (DAI) information. The UE can signal ACK or NACK for the related bundling window (A or B) in the case it has determined that all DL assignments in the bundling window have been received correctly on the PDSCH. The UE signals DTX for the bundling window in the case it notices that at least one DL assignment in the related bundling window may have not been received correctly on the (E)PDCCH.

An example for error case handling at UE side is shown in FIG. 11. Four assignments 0, 1, 2 and 3 are signalled from an eNB to the UE. The UE receives three of them correctly but notes that assignment with DAI#2 is missing. The UE notes that this assignment belongs to bundling window B. UE signals ACK or NACK corresponding to bundling window A according to CRC check of related PDSCH(s) and DTX corresponding to bundling window B. The entire bundle of window B becomes DTX if even one subframe is missing.

Various advantages may be provided. DL throughput may be improved in the case of eIMTA. UL control channel usage and/or overhead may not increase compared to LTE Release 8 baseline solution. The scheme is backwards compatible. Existing PUCCH resource allocation principles can be used as such.

It is noted that whilst embodiments have been described in relation to elements and terminology of LTE and certain releases thereof, similar principles can be applied to any other communication system or to further developments with LTE. Also, instead of transmission by fixed base stations transmissions may be provided by a non-stationary device such as a mobile station. For example, this may be the case in application where no fixed equipment provided but a communication system is provided by means of a plurality of user equipment, for example in adhoc networks or other mobile stations that can act as a base or relay station. It shall also be understood that various means can be provided to implement the herein described principles, and that the herein described examples are not intended to limit the means suitable for implementing the invention. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising
bundling, in a time division duplex system, feedback determined for a plurality of subframes sent by a sender within a time window into at least two sets of feedback information based on differently timed bundling windows defined based on subframe types, wherein one bundling window covers system information block 1 configured downlink subframes or system information block 1 configured downlink subframes and special subframes and where another bundling window covers other downlink subframes; and
communicating the bundled feedback to the sender.

2. A method as claimed in claim 1, wherein the subframes are communicated in the downlink and the feedback information is communicated in the uplink.

3. A method as claimed in claim 1, wherein determining of the feedback comprises taking into account information of a possible downlink assignment reception failure separately for each bundling window.

4. A method as claimed in claim 1, wherein the bundling comprises mapping hybrid automatic repeat request (HARQ) acknowledgements for the plurality of subframes into respective sets of feedback information for sending feedback to the sender in a subframe.

5. A method as claimed in claim 1, wherein one of the bundling windows is for flexible subframes and another bundling window is for fixed subframes.

6. A computer program product comprising a non-transitory computer-readable medium comprising a program adapted to cause an apparatus perform the steps of claim 1 when the program is run on the apparatus.

7. A method as claimed in claim 1, wherein the subframes are divided between different bundling windows based on higher layer configuration of the windows or a predetermined timing configuration of the bundling windows.

8. A method as claimed in claim 1, comprising using further bundling windows determined based on codewords.

9. A method as claimed in claim 1, wherein
the sets of feedback information for a plurality of subframes covered by the respective bundling windows comprise each a single bit, or
a set of feedback information for a plurality of subframes covered by a first bundling window comprises a plurality of bits and another set of feedback information for a plurality of subframes covered by second bundling window comprises a single bit, or the sets of feedback information for a plurality of subframes covered by the respective bundling windows comprise each a plurality of bits.

10. A method according to claim 9, comprising selecting acknowledgement resource based on determination whether hybrid automatic repeat request (HARQ) bundling of each bundling window corresponds to a positive or a negative acknowledgement.

11. A method as claimed in claim 1, wherein the bundling is provided in association with enhanced interference management and traffic adaptation (eIMTA).

12. An apparatus for a communication network, the apparatus comprising at least one processor, and at least one memory including computer program code, wherein the at least one memory and the computer program code are configured, with the at least one processor, to:
   receive, in a time division duplex system, feedback associated with a plurality of subframes within a time window from a receiver, the feedback being bundled into at least two sets of feedback information based on differently timed bundling windows defined based on subframe types, wherein one bundling window covers system information block 1 configured downlink subframes or system information block 1 configured downlink subframes and special sub frames and where another bundling window covers other downlink subframes, and
   determine possible errors in the subframes based on the at least two sets of feedback information.

13. An apparatus for a communication device, the apparatus comprising at least one processor, and at least one memory including computer program code, wherein the at least one memory and the computer program code are configured, with the at least one processor, to cause the communication device to:
   bundle feedback determined for a plurality of subframes sent by a sender within a time window in a time division duplex system into at least two sets of feedback information based on differently timed bundling windows defined based on subframe types,
   apply the bundling based on:
      a bundling window that covers system information block 1 configured downlink subframes or a bundling window that covers system information block 1 configured downlink subframes and special subframes, and
      another bundling window that covers all other downlink subframes,
   communicate the bundled feedback to the sender.

14. An apparatus as claimed in claim 13, wherein
   the sets of feedback information for a plurality of subframes covered by the respective bundling windows comprise each a single bit, or
   a set of feedback information for a plurality of subframes covered by a first bundling window comprises a plurality of bits and another set of feedback information for a plurality of subframes covered by second bundling window comprises a single bit, or
   the sets of feedback information for a plurality of subframes covered by the respective bundling windows comprise each a plurality of bits.

15. An apparatus as claimed in claim 13, wherein hybrid automatic repeat request (HARQ) acknowledgements (ACK/NACK) associated with a plurality of subframes are mapped into sets of feedback information.

16. An apparatus as claimed in claim 13, wherein one of the bundling windows is for flexible subframes and another bundling window is for fixed sub frames.

17. A device for a communication system comprising the apparatus of claim 13.

18. A method, comprising
   receiving, in a time division duplex system, feedback associated with a plurality of subframes within a time window from a receiver, the feedback being bundled into at least two sets of feedback information based on differently timed bundling windows defined based on subframe types, wherein one bundling window covers system information block 1 configured downlink subframes or system information block 1 configured downlink subframes and special subframes and where another bundling window covers other downlink subframes, and
   determining possible errors in the subframes based on the at least two sets of feedback information.

19. A computer program product comprising a non-transitory computer-readable medium comprising a program adapted to cause an apparatus perform the steps of claim 18 when the program is run on the apparatus.

* * * * *